3,501,363
PACKAGING FILM
George F. Kirkpatrick, Middlesex, N.J., assignor to Union
Carbide Corporation, a corporation of New York
No Drawing. Filed Jan. 14, 1966, Ser. No. 520,648
Int. Cl. B32b *3/00*
U.S. Cl. 161—125                                   2 Claims

---

ABSTRACT OF THE DISCLOSURE

A transparent self-supporting thermoplastic film is disclosed of the kind strongly clinging to itself and to smooth other surfaces wherein the film is embossed in a manner such that the handleability of the film is increased without reducing the cling property of the film to an ineffective level.

---

This invention is an improved thermoplastic self-supporting transparent thin film of the kind which clings strongly to itself and to other surfaces and is used, for instance, in households for temporarily covering food and open containers.

More particularly, the invention is concerned with overcoming the difficulty the user has in handling such clinging film: it sticks together on the roll and tends to ball up when in a single sheet. It is known that the handling qualities are good if the clinging property is omitted or largely destroyed, as by using a thick film or a non-blocking resin composition, or by coating or roughening the surface; but a strong clinging property is demanded by many household film users.

It is also known to emboss thermoplastic sheet and film for decorative purposes, although this has not ordinarily been done to thin clinging film. The figures conventionally used for decorative embossing are either a simulation of a fine fabric, which when used on thin clinging films greatly impairs the clinging property, or a bold design which does not significantly change either the handling or clinging properties of thin clinging films.

Table I reports the handling and clinging qualities of samples of one-half mil (0.0127 mm.) film of polyethylene, respectively with no cling additive and no embossing (sample A), with a known cling additive and no embossing (sample B) with a known cling agent and a matte surface produced by a heated steel roller roughened by blasting with 100 mesh silicone carbide, (sample C), and with a known cling additive and embossing in various sizes of boss (samples D, E and F).

TABLE I

| Sample | Area of each boss, sq. in. | Ratio, area boss to area depressed | Good handling | Good cling to glass | Good cling to self |
|---|---|---|---|---|---|
| A | None | | Yes | No | No |
| B | do | | No | Yes | Yes |
| C | Matte surface | | Yes | No | No |
| D | 0.0011 | 0.8 | Yes | Yes | No |
| E | 0.2148 | 3.2 | No | Yes | Yes |
| F | 0.4727 | 5.3 | No | Yes | Yes |

Although, as indicated in Table I, embossing these films does not generally produce a combination of good qualities for handling and clinging, it has now been discovered that such combination of qualities is achieved by embossing to a specific range of surface area of individual bosses, and a specific range of ratios of area of bosses and grooves.

The invention is a transparent self supporting thermoplastic resin thin film, less than two mils (0.05 mm.) thick, of the kind strongly clinging to itself and to other surfaces, embossed to produce patterns which contain raised portions each about 0.003 to 0.15 square inch in area (0.0194 to 0.97 sq. cm.) and depressed portions, the area ratio of raised to depressed portions being from about 0.3 to 1 to about 2.5 to 1.

Film so embossed is much easier to handle than otherwise identical unembossed film, yet retains comparable and competitive qualities of cling, transparency and strength.

Ordinarily, film about one-half mil thick (0.0125 mm.) is used for household food wrap. A practical lower limit of thickness is about 0.25 mil (0.006 mm.) and there is little or no advantage in going above one mil (0.025 mm.) unless unusual strength is required. For film of this range of thickness, it is preferred that the bosses each be 0.03 to 0.09 square inch in area (0.194 to 0.582 sq. cm.), and the area ratios of bosses to depressions be between 0.5 to 1 and 2 to 1.

The thermoplastic resins used as the thin films of this invention include the normally crystallizable film-forming polyolefins such as polyethylene; polypropylene; ethylene-propylene copolymers; copolymers of ethylene and/or propylene, or their mixtures, with minor amounts of such monoolefinic monomers as butene-1, isobutylene, acrylic acids and their esters, vinyl acetate, and styrene; and polyvinylidene chloride. A preferred resin is a polyethylene of a density in the range of 0.914 to 0.970 and a melt index between 2 and 8 (ASTM–D–123857T). As is customary, the polyolefin resin preferably contains an additive to enhance the cling qualities, a preferred additive being 0.5% to 4% (by weight of resin) selected from the group consisting of mono- and di-glycerides of fat-forming fatty acids and mixtures thereof.

Any desired shape of boss may be used, e.g. square, rectangle, triangle or any other regular or irregular polygon, oval, circle, or other pattern, either contingent or spaced and connected by depressed lines or grooves. The film may be embossed in known ways of which there are a number. A simple and satisfactory method is to feed it into the bite between a heated steel roll having the desired pattern etched or cut into its surface and a firm rubber backup roll urged by a hydraulic ram against the steel roll. To avoid damage to the film, the etched or cut roller should not have sharp edges.

For example, using polyethylene of a density between 0.914 and 0.970, a melt index between 2 and 8, and 2% to 2.5% of a mixture of mono and diglycerides of fat-forming fatty acids obtained by the glycerolysis of a mixture of beef tallow and lard fat, in the form of a film one-half mil thick, good results were obtained at roller temperatures of 140° to 200° F. (60°–93.3° C.) and a moderate pressure between the rollers, i.e., a hydraulic ram pressure of 75 to 125 p.s.i. (5.3 to 8.8 kg./sq. cm.) which produced a pressure on the film between the rollers in the range of 300 to 500 pounds (136 to 227 kg.) The steel roller was 16 inches long and 7 inches in diameter (40.6 cm. x 17.8 cm.), and had surface grooves 0.03125 to 0.09375 inch wide (0.8 mm. to 2.4 mm.) by 6 mils deep (0.15 mm.). In different instances, the surface grooves defined squares, rectangles, and triangles. The film was fed through the rollers at linear speeds of 20 to 50 feet per minute (6 to 15 meters). The height of the bosses after embossing was considerably less than 6 mils but the pattern was distinct.

Observations made of films so treated are reported in Table II.

TABLE II

| Sample | Percent cling agent | Area of each boss, sq. in. | Ratio area boss to area depressed | Handling | Cling to glass | Cling to self |
|---|---|---|---|---|---|---|
| 1 | 2.13 | 0.0977 | 2.3 | Good | Excellent | Good. |
| 2 | 2.13 | 0.0705 | 1.8 | ..do | ..do | Do. |
| 3 | 2.13 | 0.0391 | 1.3 | Very good | ..do | Do. |
| 4 | 2.50 | 0.0391 | 1.3 | Excellent | ..do | Do. |
| 5 | 2.50 | 0.0156 | 0.8 | ..do | ..do | Fairly good. |
| 6 | 2.50 | 0.0039 | 0.3 | ..do | ..do | Do. |

Some small differences between the samples 1 to 6 were noted. In general, a higher ratio of boss to depressed area and higher percentage of cling additive give somewhat poorer handling properties and somewhat better cling to self, whereas a lower ratio of boss to depressed area and a lower percentage to cling additive give somewhat better handling properties and somewhat poorer cling to self. In all cases cling to glass was excellent.

If the surfaces of the bosses and depressions are roughened, somewhat larger bosses may be used, or a higher percentage of cling additive, but the appearance of the film is less clear and transparent.

What is claimed is:

1. A transparent self supporting polyethylene film composed substantially of crystalline polyethylene containing about 0.5% to about 4% by weight of resin of a cling additive selected from the group consisting of mono- and di-glycerides of fat-forming fatty acids and mixtures thereof, the film being about one-half mil thick and having embossed raised portions each about 0.03 to 0.09 square inch in area, and the ratio of raised area to depressed area being from about 0.5 to 1 to about 2 to 1.

2. A transparent self supporting thermoplastic film of about 0.25 to about 1 mil thick and composed of a material selected from the group consisting of polyethylene and polyvinyl idene chloride and containing a cling agent additionally, said film being characterized by (a) the property of clinging strongly to itself and to smooth other surfaces, such cling property, however, normally having a disadvantageous effect on the handleability of such film; and by (b) embossed of the surface portions thereof in a repetitious pattern in which raised areas and depressed areas of such film are provided, such raised areas being about 0.003 to 0.15 square inch and the ratio of raised areas to depressed areas thereof being from about 0.3 to 1 to about 2.5 to 1; such embossment overcoming the disadvantageous effect of such cling property on handleability of such films without substantially deleteriously affecting the property of said film to cling to itself and to smooth other surfaces.

References Cited

UNITED STATES PATENTS

| 2,928,124 | 3/1960 | Hugger. |
| 3,070,462 | 2/1962 | McConnell et al. ____ 117—138.8 |
| 3,241,182 | 3/1966 | Kessler. |

FOREIGN PATENTS 586,366  11/1959  Canada.

MORRIS SUSSMAN, Primary Examiner

U.S. Cl. X.R.

117—138.8; 161—165

PO-1050
(5/69)

UNITED STATES PATENT OFFICE
CERTIFICATE OF CORRECTION

Patent No. 3,501,363  Dated March 17, 1970

Inventor(s) George F. Kirkpatrick

It is certified that error appears in the above-identified patent and that said Letters Patent are hereby corrected as shown below:

Column 3, line 38 for "polyvinyl idene", read --polyvinylidene--; and

Column 4, line 15 for "embossed", read --embossment--.

SIGNED AND
SEALED
AUG 25 1970

(SEAL)
Attest:

Edward M. Fletcher, Jr.
Attesting Officer

WILLIAM E. SCHUYLER, JR.
Commissioner of Patents